United States Patent Office 2,766,794
Patented Oct. 16, 1956

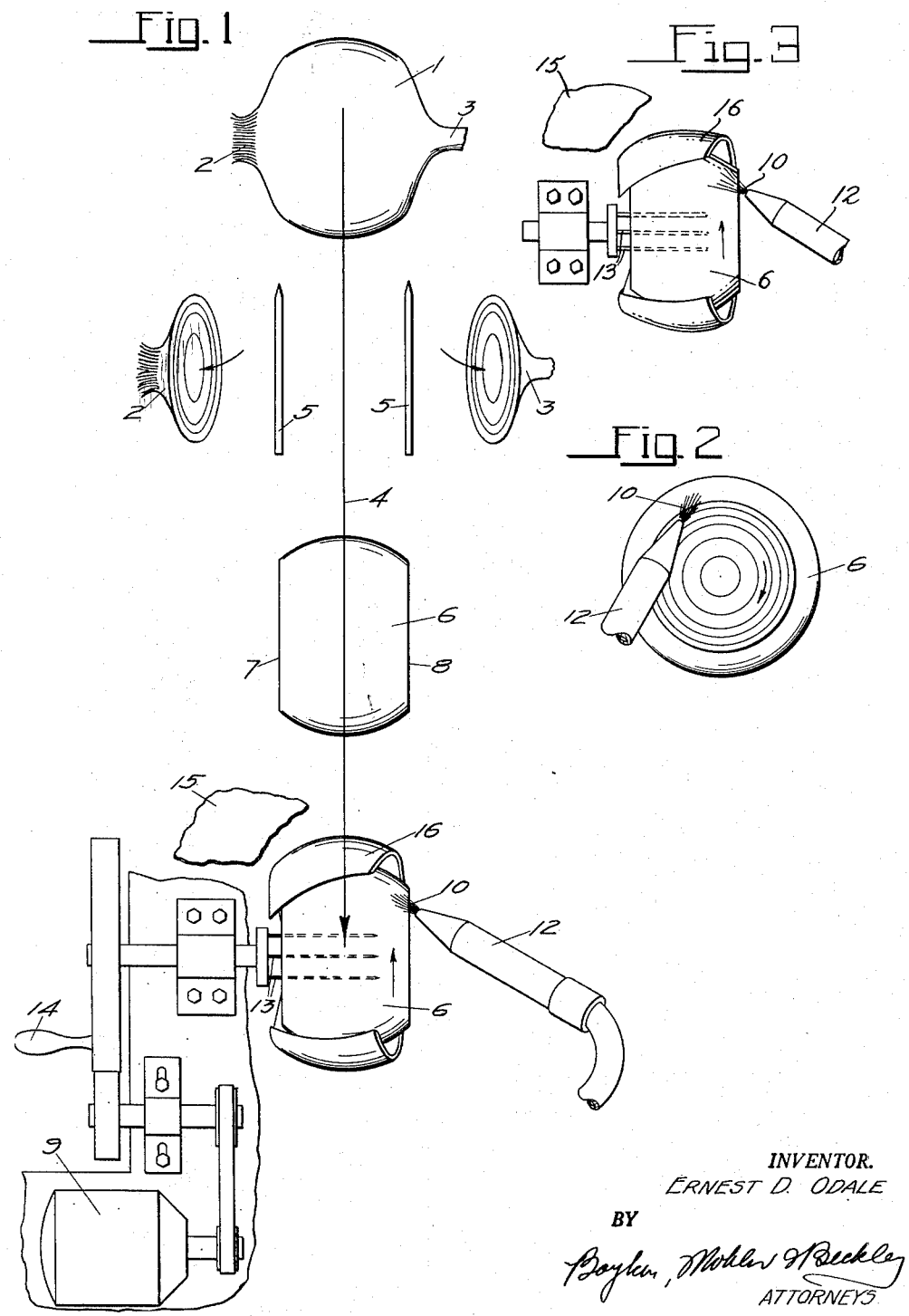

2,766,794
METHOD OF REMOVING OUTER SKIN FROM VEGETABLES

Ernest D. Odale, Vacaville, Calif., assignor, by mesne assignments, to Basic Vegetable Products, Inc., San Francisco, Calif., a corporation of California Application June 20, 1952, Serial No. 294,655

2 Claims. (Cl. 146—227)

This invention relates to a method of preparing vegetables and has for its main objective the removal of skin and bruised or deteriorated layers of tissue.

In the drawings,

Fig. 1 diagrammatically shows the steps of the method as applied to onions, including the removal of the root and stem ends.

Fig. 2 illustrates only the step of removing the skin and any outer layer or layers that might be weakened, the position of the onion being in a place at right angles to the position of the onion as shown in Fig. 1 and Fig. 3 shows an onion supported for rotation solely under the influence of air from a jet.

In detail, each onion has a root end 2 and a stem end 3 projecting therefrom along the root-stem axis of the onion, with which said root and stem ends are coaxial.

Each onion is preferably moved along a path of travel 4 (indicated by the arrow in Fig. 1 with its root stem axis perpendicular to the direction of travel, and at a point along said path a pair of cutters 5 in spaced, parallel, opposed relationship remove the root and stem ends 2, 3 in planes normal to the root stem axis of each onion. The main central body 6 of the onion continues past said cutters, having parallel oppositely outwardly cut faces 7, 8, these being at the root and stem sides of the body.

The body 6 is now supported for rotation on its root-stem axis by any suitable means, such as a rotary holder having pins 13 on which the body may be impaled with said pins substantially equally spaced around the root stem axis. The holder may be rotated by a hand crank 14, or by power from a source of power 9, or as will later be explained, the onion may be rotated solely from the force of a jet 10 directed from a nozzle 12, and the hand crank and power means omitted as seen in Fig. 3.

The body 6, is so supported for rotation that the cut faces are fully exposed at the outermost layers.

The nozzle 12 or any other suitable means for directing the jet 10, is so positioned that the jet is directed generally axially and outwardly relative to the root-stem axis of each onion at substantially the outer layer and skin. Jet 10 may be air or water under pressure.

When jet 10 is directed in the manner described, and the onion is rotated on its root stem axis or generally on said axis, the outer skin 15 is quickly removed and blown away, and if there is a point of weakness at any point around the outer layer 16 of the onion directly below the outer skin, such as caused by a bruise, cut, or similar injury, or by disintegration, such layer will be broken at said point and will also be removed. The same will happen to the next layer if it has been similarly weakened.

As has been indicated hereinbefore, the rotation of the onion may be accomplished by power or by hand. Where the rotary support is freely rotatable, the nozzle 12 is so positioned that the jet is not only directed generally axially and outwardly relative to the root stem axis of the onion, but is also directed at a slight angle to a plane bisecting the onion along its root-stem axis, so that the onion will be caused to rotate on its axis by the force of the jet and the outer skin will be quickly and very efficiently removed from the onion. The same is true of the next layer if it is weakened (Fig. 2).

In the claims, where the word "axis" is used without a qualifying description, it is intended to refer to the root-stem, blossom-stem or other similar axis that is coincident with the stem or stem end of the vegetable, and it is to be understood that the invention is not to be necessarily restricted to onions, but may be used where the vegetable or fruit, such as garlic and other vegetables or fruit has an outer layer or layers capable of removal therefrom upon introduction of a jet between the outer layer and the body.

I claim:

1. The method of removing the skin and weakened outer layer of an onion from the body thereof after the root and stem ends have been cut from such onion in planes normal to its root-stem axis that comprises; supporting said body for rotation on its root-stem axis and at the same time directing a jet generally axially and outwardly relative to said axis against one of the cut end faces of said body substantially at the outermost layer, and with said jet directed at a slight angle relative to a plane extending radially from and parallel with said axis and through the point of impingement between said jet and said outermost layer to cause said rotation of said body on said axis.

2. The method of preparing an onion and the like for slicing that comprises the steps of; cutting off the root and stem ends of such onion, then supporting said onion for rotation about its root-stem axis, directing a jet generally axially and outwardly against one of the cut end surfaces of said onion at its outer layer at a velocity sufficient to remove its dried outer skin and to remove the outer layer next to said skin in the event said outer layer is weakened at any point therearound by a bruise, cut, deterioration or other injury, and rotating said onion about its said axis by the force of said jet.

References Cited in the file of this patent

UNITED STATES PATENTS

| | | |
|---|---|---|
| 325,903 | Bittenbender | Sept. 8, 1885 |
| 1,243,724 | Fenn | Oct. 23, 1917 |
| 2,056,843 | Erro | Oct. 6, 1936 |
| 2,445,881 | Hemmeter | July 27, 1948 |
| 2,551,156 | Polk et al. | May 1, 1951 |
| 2,612,170 | Dudley | Sept. 30, 1952 |
| 2,628,621 | Murdoch | Feb. 17, 1953 |